(12) United States Patent
Li et al.

(10) Patent No.: US 8,553,307 B2
(45) Date of Patent: Oct. 8, 2013

(54) DOUBLE-PROJECTION APPARATUS

(75) Inventors: Ta-Ching Li, Taoyuan County (TW); Sheng-Chih Shen, Taoyuan County (TW); Ming-Ting Shih, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 110 days.

(21) Appl. No.: 13/334,151

(22) Filed: Dec. 22, 2011

(65) Prior Publication Data
US 2013/0163060 A1      Jun. 27, 2013

(51) Int. Cl.
*G02B 26/08*     (2006.01)

(52) U.S. Cl.
USPC ..................................... 359/200.8; 359/224.1

(58) Field of Classification Search
USPC ................................. 359/200.8, 223.1–226.1
See application file for complete search history.

(56) References Cited

U.S. PATENT DOCUMENTS 7,659,918 B2 *   2/2010   Turner .......................... 347/239

* cited by examiner

*Primary Examiner* — Euncha Cherry
(74) *Attorney, Agent, or Firm* — Jackson IPG PLLC

(57) ABSTRACT

Disclosed is a double-projection apparatus. The double-projection apparatus includes a frame, a carrier, two eccentric axles, a mirror-twisting axle, two scanning mirrors and two piezoelectric actuators. The carrier is provided in the frame, and includes an opening defined therein. Each of the eccentric axles includes an end connected to the frame and another end connected to the carrier. The mirror-twisting axle is provided in the opening. The scanning mirrors are provided in the opening and connected to two sides of the mirror-twisting axle. The piezoelectric actuators are connected to two sides of the frame.

5 Claims, 3 Drawing Sheets

DOUBLE-PROJECTION APPARATUS

BACKGROUND OF INVENTION

1. Field of Invention

The present invention relates to a double-projection apparatus and, more particularly, to a double-projection apparatus including two piezoelectric actuators for identical or different vibrations for moving two scanning mirrors in a same direction or two different directions.

2. Related Prior Art

The field of micro electro-mechanical systems ("MEMS") is a promising, advanced field. MEMS are traced back to the mid 1960's when the concept of making a machine on a chip in a semiconductor process was first advocated. In the mid 1970's, a MEMS technique was first used to make a semiconductor sensor which is a combination of a mechanical structure with electronic elements. Since the 1980's, there have been developed many techniques for making MEMS including not only sensors but also micro pumps, micro valves, micro gears, micro motors and micro clamps. As the MEMS technology is getting mature and used in a growing number of fields, there are attempts to make complete micro systems for sensing, actuating, signal-processing and controlling. Examples of such complete micro systems are micro robots and micro hard disc drives. Hopefully, the MEMS technology will become a critical technology in the century like the semiconductor technology in the $20^{th}$ century.

Based on the MEMS technology, there have been made various products such as micro projectors that save energy and are miniature and inexpensive. The micro projectors include head-up displays ("HUD"), portable projectors and protection modules that can be integrated with hand-held devices. The micro projectors are used in vehicle electronics, satellite navigation, smart phones, personal computers, displays, toys and consumer products.

A mobile device equipped with a micro projector considerably increases the convenience in sharing files. In particular, mobile phones are used for more and more tasks. However, mobile phones are equipped with small displays and fall short on providing clear pictures. Micro projectors satisfy this need. There is an on-going trend to make small, inexpensive projectors.

A typical micro projector includes a laser source and a micro mirror equipped with an actuator. The actuator is operated to rotate the micro mirror to reflect laser to different directions to form scanning light to provide pictures.

The cost of the micro mirror of the micro projector is determined by the way the micro mirror is rotated by the actuator. To provide the scanning light, a micro mirror is made on a chip and connected to an actuator. The structure of the typical micro mirror is simple. The making of the typical micro mirror of a single material is difficult due to big difference between the frequencies of the rotation of two axles.

The present invention is therefore intended to obviate or at least alleviate the problems encountered in prior art.

SUMMARY OF INVENTION

It is the primary objective of the present invention to provide a reliable, easy-to-make double-projection apparatus.

To achieve the foregoing objective, the double-projection apparatus includes a frame, a carrier, two eccentric axles, a mirror-twisting axle, two scanning mirrors and two piezoelectric actuators. The carrier is provided in the frame, and includes an opening defined therein. Each of the eccentric axles includes an end connected to the frame and another end connected to the carrier. The mirror-twisting axle is provided in the opening. The scanning mirrors are provided in the opening and connected to two sides of the mirror-twisting axle. The piezoelectric actuators are connected to two sides of the frame.

In the double-projection apparatus, the frame may include two extensive portions each connected to a respective one of the piezoelectric actuators.

In the double-projection apparatus, each of the eccentric axles may be I-shaped.

In the double-projection apparatus, the mirror-twisting axle may include two Y-shaped portions connected to each other.

In the double-projection apparatus, each of the scanning mirrors is a micro mirror at an angle of 0° to 60°. The scanning mirrors can scan two identical articles.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
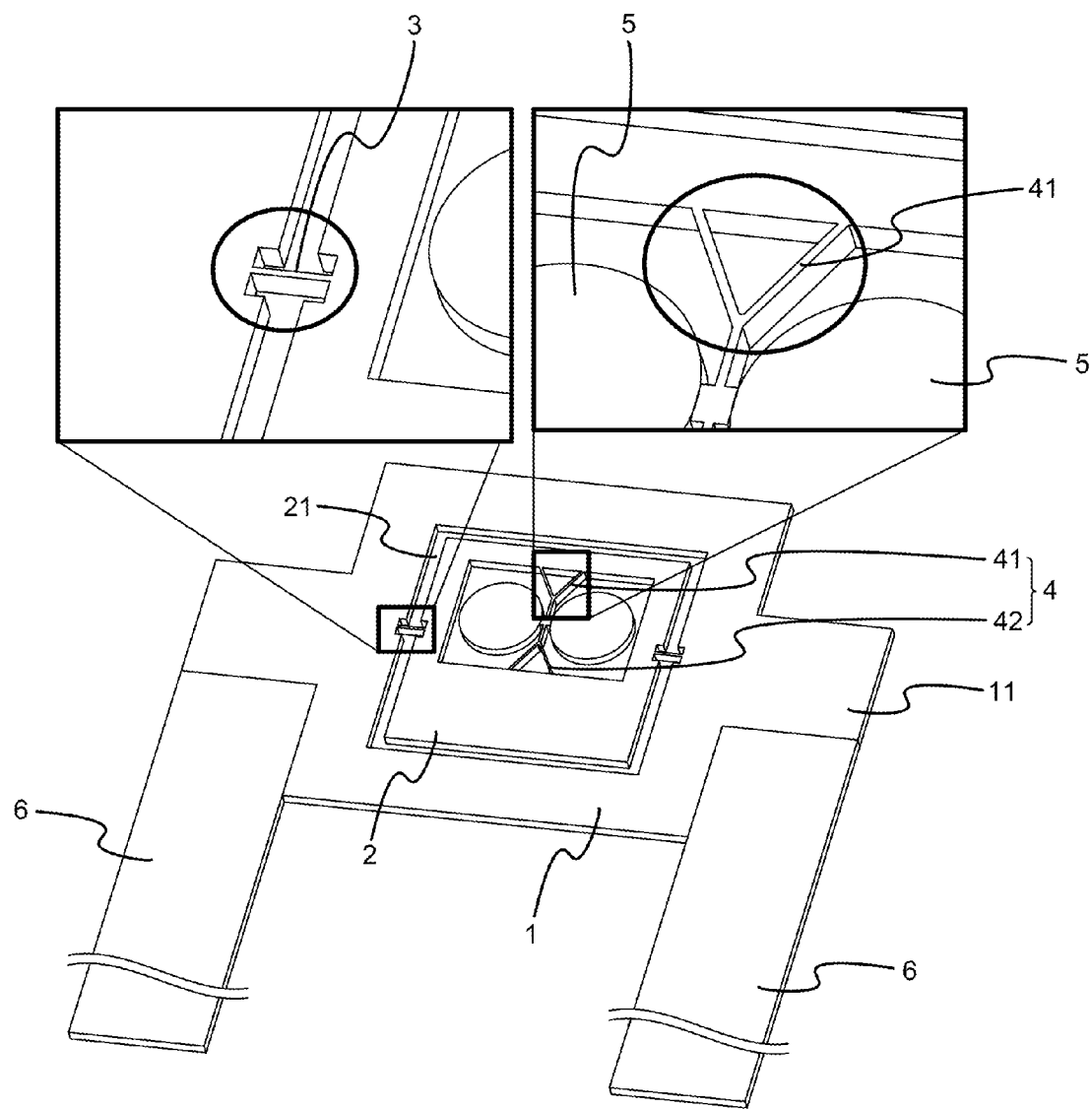
FIG. 1 is a perspective view of a double-projection apparatus according to the preferred embodiment of the present invention.

Referring to FIG. 1, there is shown a double-projection apparatus in accordance with the preferred embodiment of the present invention. The double-projection apparatus includes a frame 1, a carrier 2, two eccentric axles 3, a mirror-twisting axle 4, two scanning mirrors 5 and two piezoelectric actuators 6.

The frame 1 includes two extensive portions 11 each extending from a lateral side. The extensive portions 11 extend opposite to each other.

The carrier 2 is provided in the frame 1. There is a gap defined between the carrier 2 and the frame 1. The carrier 2 includes an opening 21 defined therein.

The eccentric axles 3 are I-shaped. Each of the eccentric axles 3 includes an end connected to the carrier 2 and another end connected to the frame 1. The eccentric axles 3 extend opposite to each other.

The mirror-twisting axle 4 is provided in the opening 21, and includes two Y-shaped portions 41 and 42. The Y-shaped portions 41 and 42 are made with a same configuration but extend opposite to each other. In detail, each of the Y-shaped portions 41 and 42 includes first and second branches connected to the carrier 2 and a third branch connected to the third branch of the other Y-shaped portion.

The scanning mirrors 5 are provided in the opening 21 and connected to the mirror-twisting axle 4. The mirror-twisting axle 4 is located between the scanning mirrors 5. In detail, the scanning mirrors 5 are connected to the third branches of the Y-shaped portions 41 and 42 of the mirror-twisting axle 4. The scanning mirrors 5 are micro mirrors made with an angle of 0° to 60°. The scanning mirrors 5 can be used to scan two identical articles.

Each of the piezoelectric actuators 6 is connected to a respective one of the extensive portions 11 of the frame 1.

In operation, a voltage is provided to each of the piezoelectric actuators 6. In compliance with the converse piezoelectric effect, each of the piezoelectric actuators 6 turns the voltage into a displacement.

Figure 2:
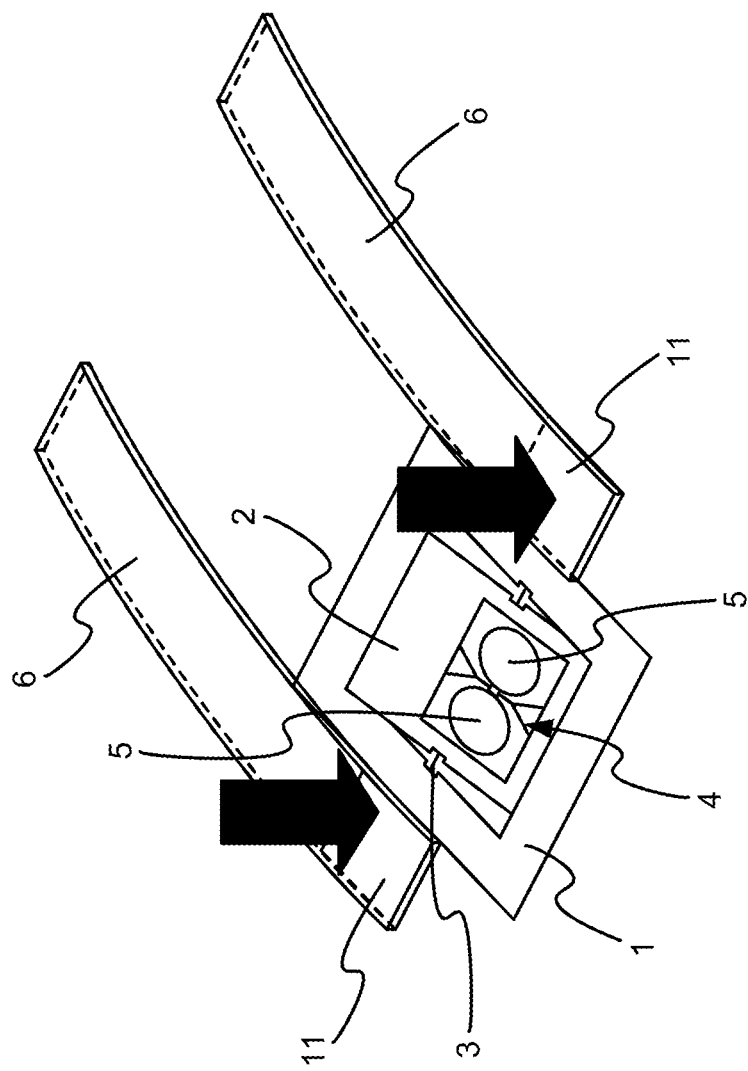
FIG. 2 is another perspective view of the double-projection apparatus shown in FIG. 1.

Identical voltages may be provided to the piezoelectric actuators 6 so that the piezoelectric actuators 6 vibrate at identical frequencies for causing displacements in identical directions. Now, the frequencies are used to vibrate the eccentric axles 3 to tilt the carrier 2 forward and backward in the frame 1. Thus, the scanning mirrors 5 are moved in a same direction by the carrier 2 as shown in FIG. 2.

Figure 3:
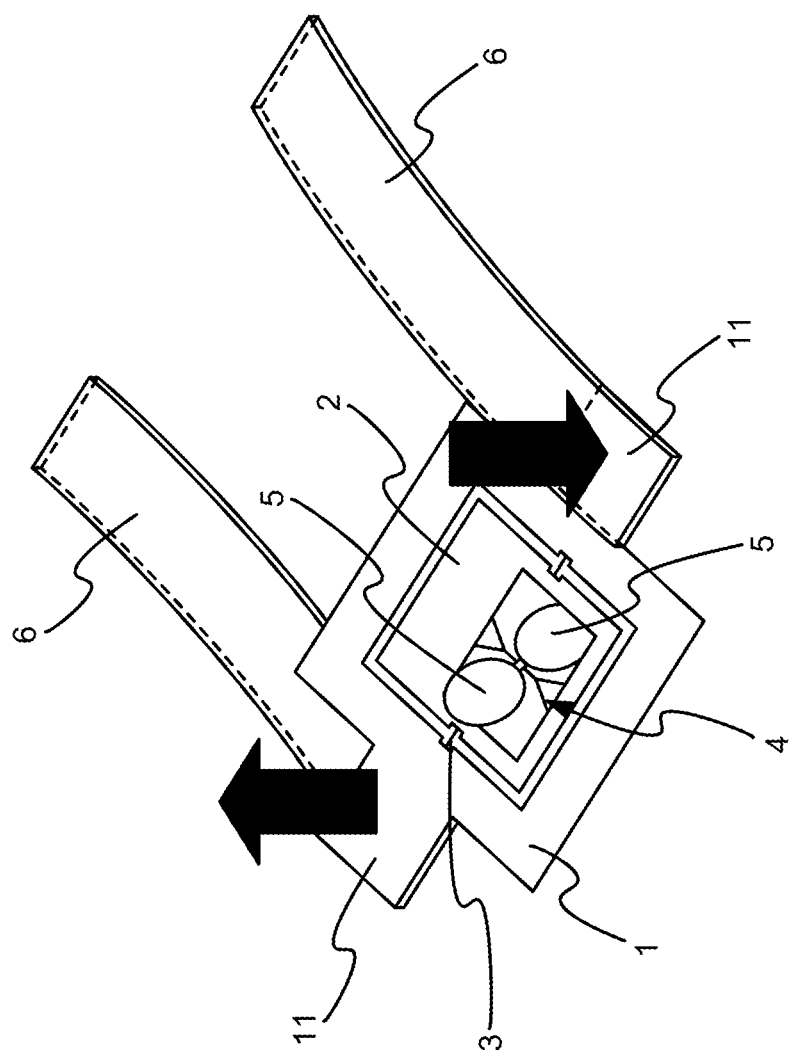
FIG. 3 is a perspective view of the double-projection apparatus in another position than shown in FIG. 2.

Alternatively, different voltages that are 180° apart from each other may be provided to the piezoelectric actuators 6. Thus, the piezoelectric actuators 6 vibrate at different frequencies for causing displacements in different directions. In this case, the frequencies are used to vibrate the Y-shaped portions 41 and 42 of the mirror-twisting axle 4 to move the carrier 2 to the right and left in the frame 1 to rock the scanning mirrors 5 like a scale. Thus, the resolution of horizontal scanning is increased, and concentration of stress in the connective portions is avoided as shown in FIG. 3.

According to the present invention, based on the converse piezoelectric effect, the displacements of the piezoelectric actuators 6 are produced, and the vibrations of the scanning mirrors 5 are produced accordingly. The vibrations are used to excite the natural frequencies of the elements.

As discussed above, the double-projection apparatus of the present invention overcomes the drawbacks of the prior art. The piezoelectric actuators 6 vibrate identically or differently to move the scanning mirrors in a same direction or two different directions. Moreover, the double-projection apparatus can easily be made of a single material.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A double-projection apparatus including:
   a frame (1);
   a carrier (2) provided in the frame (1), wherein the carrier (2) includes an opening (21) defined therein;
   two eccentric axles (3) each including an end connected to the frame (1) and another end connected to the carrier (2);
   a mirror-twisting axle (4) provided in the opening (21);
   two scanning mirrors (5) provided in the opening (21) and connected to two sides of the mirror-twisting axle (4); and
   two piezoelectric actuators (6) connected to two sides of the frame (1).

2. The double-projection apparatus according to claim 1, wherein the frame (1) includes two extensive portions (11) each connected to a respective one of the piezoelectric actuators (6).

3. The double-projection apparatus according to claim 1, wherein each of the eccentric axles (3) is I-shaped.

4. The double-projection apparatus according to claim 1, wherein the mirror-twisting axle (4) includes at least two Y-shaped portions (41), (42) connected to each other.

5. The double-projection apparatus according to claim 1, wherein each of the scanning mirrors (5) is a micro mirror at an angle of 0° to 60°,
   wherein the scanning mirrors (5) are configured to scan two identical articles.

* * * * *